No. 830,650. PATENTED SEPT. 11, 1906.
G. O. DOLL.
WAGON BRAKE.
APPLICATION FILED MAY 8, 1905.
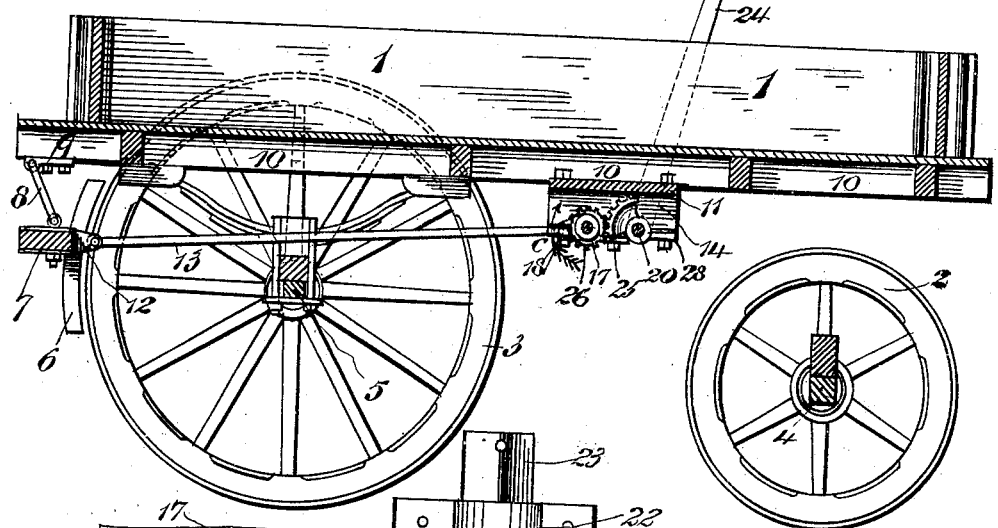
WITNESSES:
Wm O. Morck
F. Gimbel.
INVENTOR
George O Doll
BY
Thompson Bell
ATTORNEY

UNITED STATES PATENT OFFICE.

GEORGE O. DOLL, OF CAMBRIDGE CITY, INDIANA, ASSIGNOR OF ONE-HALF TO THOMAS A. SCOTT, OF BENTONVILLE, INDIANA.

WAGON-BRAKE.

No. 830,650.        Specification of Letters Patent.        Patented Sept. 11, 1906.

Application filed May 8, 1905. Serial No. 259,369.

*To all whom it may concern:*

Be it known that I, GEORGE O. DOLL, a citizen of the United States, residing at Cambridge City, in the county of Wayne and State of Indiana, have invented certain new and useful Improvements in Wagon-Brakes, of which the following is a specification, reference being had therein to the accompanying drawings.

This invention relates to improvements in brakes for wagons; and it consists in a novel mechanism for applying the brakes and retaining them in contact with the wheel or wheels of the wagon or what is commonly known as maintaining the brakes "set," and will be hereinafter more fully described in the specification and particularly pointed out in the claim.

The object of this invention is to provide a brake mechanism that is readily applied to wagons or other vehicles, which mechanism may be operated by a shoe-brake lever situated at either side of the front portion of the wagon adjacent to the driver and in such position on the wagon as to be easily accessible by the driver and that will be more powerful than the ordinary lever-brake power; also, to provide a brake-operating mechanism that will remain set and maintain the brakes in their set position or in contact with the wheels until released by the operator. I attain these objects by means of the mechanism illustrated in the accompanying drawings, in which similar numerals of reference designate like parts throughout the several views.

Figure 1 is a longitudinal sectional elevational view of a wagon, showing my invention of a brake mechanism applied thereto. Fig. 2 is a detail enlarged inverted plan view of the brake-gearing, and Fig. 3 is a similar inverted detail elevational view looking in the direction of the arrow *a*. (See Fig. 2.)

An open wagon 1 is carried by suitable forward wheels 2 and rear wheels 3, mounted on their supporting-axes 4 and 5. The brake-shoes 6 may be of any suitable form secured on the ends of the brake-beams 7. Brake-hangers 8, whereby the brake-beams 7 are suspended, depend from the brake-hanger straps 9, which latter are secured to the longitudinal side sills 10 of the wagon. Situated underneath the body of the wagon at a point in advance of the rear wheels 3 is a cross-beam 11, which extends transversely across and along the bottom of the wagon and is secured at its ends to the side sills 10. At a point intermediate the ends of the brake-beams 7 is secured a clevis 12, to which the rear end of the brake-rod 13 is hingedly connected, and the forward end of said rod is connected to the brake-operating mechanism, which I will now proceed to describe.

Double-bearing pedestals 14, provided with the bearings 15 and 16, are secured to the bottom side of the cross-beam 11 in such position thereon that when the crank-shaft 17 is placed in its bearings 16 the crank 18 will fall in the proper plane to engage the bend 19, formed on the forward end of the brake-rod 13.

The brake-shaft 20 extends entirely across the bottom of the wagon and has its ends supported in hangers 22, which latter are secured to the bottom side of the sills 10 and are provided to support the prolonged or overhanging ends of said shaft. The ends of the brake-shaft 20, that project beyond said hangers 22, are preferably provided with the square ends 23 to receive the square eyes of the operating-levers 24, which levers are removably secured on the ends of said shaft, so that the brakes may be operated from either side of the wagon whether the operator be on the wagon or on the ground.

A mutilated or segmental gear 25 is secured on that portion of the shaft 20 situated between the pair of bearings 15 of the pedestals 14, and the said mutilated gear is arranged to mesh or engage with the crank-shaft gear 26, which latter is secured on the crank-shaft 17 to turn the latter.

When the operator desires to apply the brakes, all that is necessary to be done is to pull the brake-lever 24 in the direction of the arrow *b* to revolve the crank 18 in the direction of the arrow *c* until it contacts with the stop-plate 27, at which position, it will be observed on referring to Fig. 3, the center of the brake-rod 13 is in alinement, or nearly so, with the center of the crank and the center of the shaft 17. In other words, the crank 18 is on a dead-center, so that the brake-rod 13 has no influence over it to cause it to rotate in the reverse direction to release the brake-shoes 6. The brake-shoe mechanism is therefore locked in position to maintain the brakes set. When the brakes are thus set, it will be readily seen that they cannot be released until the operator moves the lever 24 in the direction opposed to that indicated by the arrow $b$.

The pedestal-bearings 14 are provided with the removable caps 28 for the purpose of readily removing the shafts 17 and 20 when so desired, which caps are secured to their pedestals 14 by suitable bolts.

The overhanging stop-plate 27 is held in position intermediate the bearings 15 and 16 on that pedestal situated nearest the crank 18 in position thereon to contact with the end of said crank when the latter is moved in the position illustrated in Fig. 3.

Having thus fully described this my invention, what I claim as new and useful, and desire to cover by Letters Patent of the United States therefor, is—

In a wagon-brake, the combination with a wagon mounted on suitable wheels, brake-hangers depending from the body of said wagon, brake-shoes carried by said hangers, and a brake-beam, of a pair of horizontally-extending parallel shafts situated beneath the bed of said wagon, one of which shafts extends beyond the sides of the wagon, brake-levers on the projecting ends of said longer shaft, a crank on one end of said shorter shaft, a brake-rod connecting said crank and said brake-beam, a mutilated gear on said longer or brake shaft, a gear on said crank-shaft meshing with said mutilated gear, and a crank-shaft plate situated in a plane directly above said crank, so that, when the crank has passed above its center to contact with said stop-plate and thereby become locked said brake-shoes will be retained in contact with the wagon-wheels to lock them.

In testimony whereof I affix my signature in presence of two witnesses.

GEORGE O. DOLL.

Witnesses:
J. R. MAUK,
MATT. SHEW.